United States Patent
Li et al.

(10) Patent No.: US 9,944,545 B2
(45) Date of Patent: Apr. 17, 2018

(54) METHOD FOR SLUDGE-REDUCED ELECTROCATALYTIC REDUCTION-OXIDATION PRETREATMENT OF NITROTOLUENE PRODUCTION WASTEWATER

(71) Applicant: Nanjing University, Nanjing (CN)

(72) Inventors: Aimin Li, Nanjing (CN); Yeli Jiang, Nanjing (CN); Changming Wang, Nanjing (CN); Qing Zhou, Nanjing (CN); Zhaolian Zhu, Nanjing (CN); Baijun Wang, Nanjing (CN); Zixiao Xu, Nanjing (CN); Mengqiao Wang, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 134 days.

(21) Appl. No.: 15/023,906

(22) PCT Filed: Sep. 23, 2014

(86) PCT No.: PCT/CN2014/087172
§ 371 (c)(1),
(2) Date: Mar. 22, 2016

(87) PCT Pub. No.: WO2015/043449
PCT Pub. Date: Apr. 2, 2015

(65) Prior Publication Data
US 2016/0257582 A1    Sep. 8, 2016

(30) Foreign Application Priority Data
Sep. 26, 2013 (CN) .......................... 2013 1 0444467

(51) Int. Cl.
*C02F 1/46* (2006.01)
*C02F 1/467* (2006.01)
(Continued)

(52) U.S. Cl.
CPC .......... *C02F 1/4676* (2013.01); *C02F 1/4672* (2013.01); *C02F 1/66* (2013.01);
(Continued)

(58) Field of Classification Search
None
See application file for complete search history.

(56) References Cited

U.S. PATENT DOCUMENTS

| | | | | |
|---|---|---|---|---|
| 4,125,445 A | * | 11/1978 | Hurley ................ | C02F 1/4676 205/688 |
| 2011/0284391 A1 | * | 11/2011 | Fritz .................... | C02F 1/4672 205/703 |

* cited by examiner

*Primary Examiner* — Arun S Phasge

(57) ABSTRACT

Embodiments herein relate to methods for sludge reduction for pretreatment of nitrotoluene wastewater using electrocatalytic redox. The embodiments may include (a) adjusting a pH of the nitrotoluene wastewater to 1.5 to 2.0, standing for precipitation, draining sludge of the nitrotoluene wastewater at the bottom, obtaining supernatant of nitrotoluene wastewater, placing the supernatant through a cathode inlet into a cathode chamber of an electrochemical reactor; (b) performing electrochemical treatment, wherein reduction reaction of the supernatant of the nitrotoluene wastewater takes place at the cathode chamber, the nitrotoluene wastewater is placed into the anode chamber for oxidation reaction through the cathode outlet, the catholyte tank, and the anode inlet in sequence; (c) adjusting the nitrotoluene wastewater treated in step (b) via the anolyte tank, and then discharging the nitrotoluene wastewater into a biochemical system. The embodiments reduce toxicity of mixed acid nitration wastewater and therefore improve its biodegradability.

4 Claims, 1 Drawing Sheet

(51) Int. Cl.
  *C02F 1/66*     (2006.01)
  *C02F 1/461*    (2006.01)
  *C02F 101/38*   (2006.01)
  *C02F 103/36*   (2006.01)
  *C02F 101/34*   (2006.01)
(52) U.S. Cl.
  CPC ............... *C02F 2001/46138* (2013.01); *C02F 2001/46142* (2013.01); *C02F 2101/34* (2013.01); *C02F 2101/38* (2013.01); *C02F 2103/36* (2013.01); *C02F 2201/4618* (2013.01); *C02F 2201/46115* (2013.01)

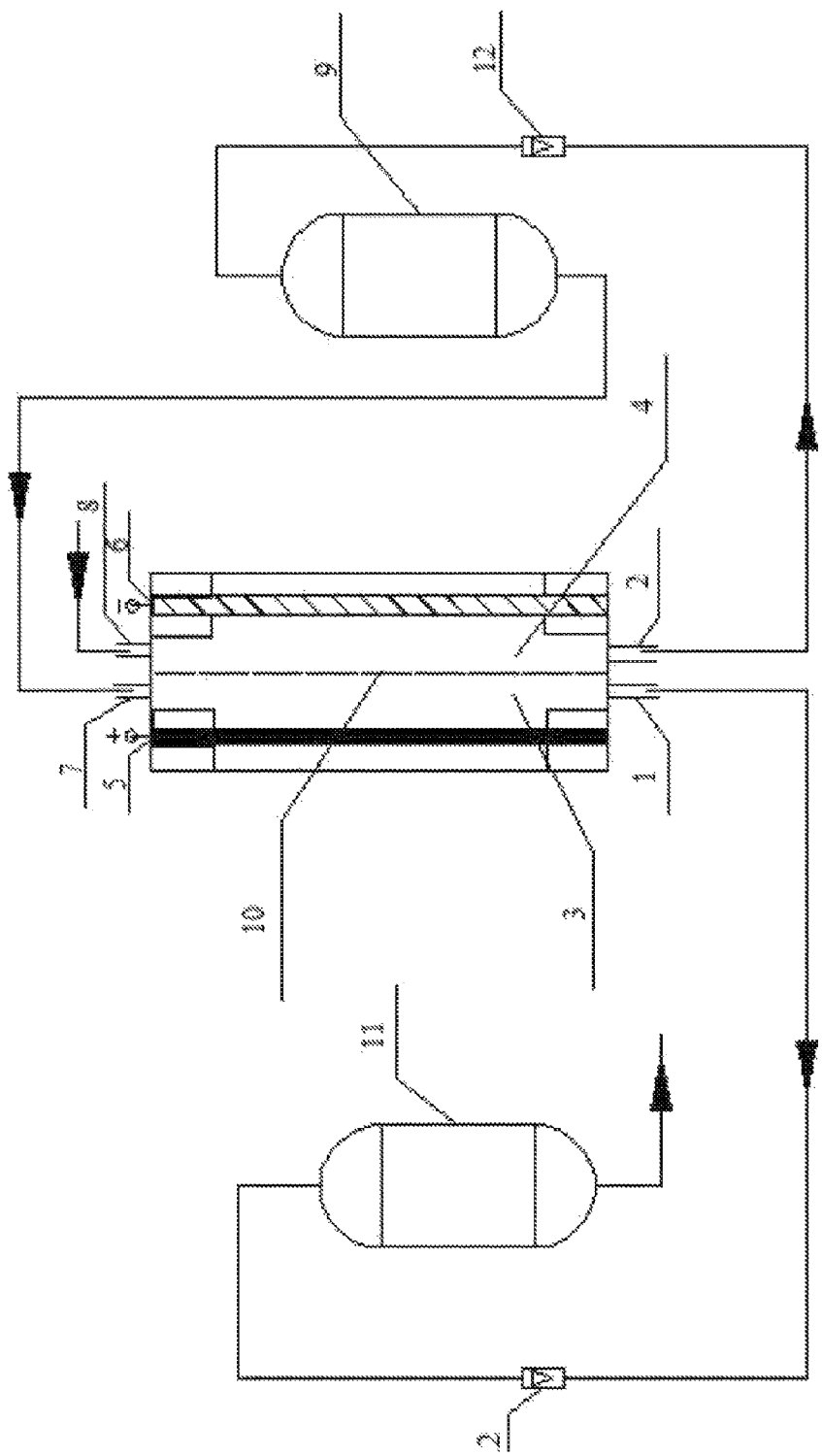

METHOD FOR SLUDGE-REDUCED ELECTROCATALYTIC REDUCTION-OXIDATION PRETREATMENT OF NITROTOLUENE PRODUCTION WASTEWATER

CROSS REFERENCE TO RELATED APPLICATION

This application is a national stage application of International application number PCT/CN2014/087172, filed on Sep. 23, 2014, titled "Method for Sludge-Reduced Electrocatalytic Reduction-Oxidation Pretreatment of Nitrotoluene Production Wastewater," which claims the priority benefit of Chinese Patent Application No. 201310444467.0, filed on Sep. 26, 2013, which is hereby incorporated by reference in its entirety.

TECHNICAL FIELD

The present disclosure relates to the field of nitrotoluene wastewater treatment, particularly, to electrochemical pretreatment method for high-concentration wastewater containing mixed acid nitration, and more particularly, to methods for sludge reduction for pretreatment of nitrotoluene wastewater using electro-catalytic redox.

BACKGROUND

Production of dinitrotoluene mainly involves mixed acid nitration processes. Uses of nitrate as nitrating agent, such as sulfuric acid as a catalyst to react with aromatic nitroaromatics, are a very important chemical process. Its main products include nitrobenzene, nitrotoluene, trinitrotoluene, nitro chlorobenzene and the like. The mixed acid nitration process may produce wastewater, which is highly colorful and has poor biodegradability. The main components of the wastewater include nitrotoluenes, toluene amines, acid class and multi-nitrophenols.

Treatment of mixed acid nitration wastewater is a hot spot in the field of environmental engineering. Developed countries generally use pretreatment involving stripping+thermal decomposition+ammonia distillation, which is expensive and difficult to expand. Some countries developed chemical treatment including a promising method: a wet oxidation method. Because nitrobenzene and nitrophenol are relatively stable under normal conditions and are not easy to break down, wet oxidation takes place at higher temperatures and under pressure. For example, a reaction temperature is generally 325 to 375° C., pressure of $2.20 \times 10^7$ to $3.45 \times 10^7$ Pa, the reaction time is 5 min. In such conditions, CO2, H2O and other simple small molecule compounds are generated out of oxidation of organic matters. According to a German patent (U.S. Pat. No. 5,356,539), nitro chlorobenzene or nitrobenzene waste water is heated to 100 to 300° C., under a pressure of $2 \times 10^5$ to $1 \times 10^7$ Pa with a catalyst, such as CuO, $Al_2O_3$ or magnesium or Cu, Cr, Zn oxide Al2O3, such that oxidative decomposition of organic matters takes place and more than 90% nitrobenzene and nitro chlorobenzene are degraded. However, there are problems with wet oxidation processes. These problems include high initial investment, high technical requirements (e.g., reactor sealed and heat-resistant materials), and requirement of additional investment for catalysts, which results in secondary pollution.

Methods for treating nitrification wastewater including chemical and adsorption techniques have been used in China. For example, some companies adopt an adsorption process in which adsorbents are mainly activated carbons and resins. The presence of activated carbons as an adsorbent for adsorption causes difficulties to recycle the adsorbent and to generates a lot of waste. This waste contains a large number of nitrobenzene substances as well as hazardous solid waste and incurs high processing costs. It has been reported that resin adsorption methods (e.g., methods related to ultra-crosslinked resins) have been used to treat nitrobenzene and nitro chlorobenzene waste. These methods are simple; however, the costs are very high and desorption solution needs to be processed.

Chinese patent application number: 200810121721 adopts acidification+iron+carbon reduction condensation+flocculation and settling pretreatment methods. Its process requires adding a lot of iron, carbon, and promote polymerization inhibitors (formaldehyde), flocculants (polyacrylamide, chloride, ferric chloride, ferric sulfate and ferric chloride polymerization), and produces a large number of iron-containing sludge, which are difficult to dispose. Chinese patent application No: 200910031041 adopt carbon reduction of iron oxide+Fenton methods+coagulating sedimentation process to treat mixed acid nitration wastewater. The method added calcium hydroxide in coagulation stations, resulting in a large amount of iron and calcium sewage sludge mud. This makes sludge became new contaminants, which are treated according to standards for hazardous solid waste. In these instances, the costs are high, and there are security risks associated with this method.

Techniques for treating electrochemical water, emissions, soil pollution have developed rapidly since the 1980s. Electrochemical methods and other methods have good compatibility and the combination thereof achieves the best treatment effect. Electrochemical treatment can be used to treat pollutants in sewage, waste gas and heavy metal ions, and its principles and methods include electrochemical oxidation, electrochemical reduction, photoelectrochemical oxidation, flotation and electrical power adsorption/electrical agglomeration. The electrochemical reduction generally occurs at a cathode, and the electrochemical oxidation can occur at an anode or cathode. The oxidation mechanism of the cathode is reduction of $O_2$ to $H_2O_2$, thereby generating .OH oxidation of organic matters. Anode and cathode areas are generally separated by a membrane. Main forms of membranes include a salt bridge, an ion exchange membrane system and glass filter plate, etc. Ion-exchange membrane is divided into an anion exchange membrane and a cation exchange membrane. But electrochemically treated wastewater nitrotoluene is still in a conceptual stage. For example, Germany's BASF was the first company in Europe to try such techniques. The company filed patent application No: 201180025180.3 that described methods for removing nitroaromatic compounds. The method includes an aqueous composition including at least one aromatic nitro compound introduced into the electrolytic cell anode compartment and electrolyzed at an anode current density 0.1-10 kA/m2 and a cell potential of 4-15V; the cell has at least one anode; an anode including an anode section containing at least one section made of platinum or a carrier material and a coating formed; wherein the carrier material comprises at least one member selected from niobium (Nb), tantalum (Ta), titanium (Ti) and hafnium (Hf) metal, and the coating of boron-doped diamond. This is a bold attempt, but there are problems such as high costs and poor efficiency. Therefore, under conventional techniques, electrochemical methods for treating nitrotoluene wastewater incur high costs and complex operations.

SUMMARY

1. Problems

Conventional techniques for treating nitrotoluene wastewater have problems such as high costs, high operational criteria, and generation of a large amount of waste. Embodiments herein relate to methods for sludge reduction for pretreatment of nitrotoluene wastewater using electro-catalytic redox. The embodiments can reduce toxicity of mixed acid nitration wastewater and therefore improve its biodegradability. By electrochemical reduction coupled with electrochemical oxidation process, the embodiments transform degraded of nitrobenzene and nitro phenols to provide favorable conditions for a subsequent biochemical process.

2. Technical Solutions

To solve the problems above, the implementations provides a method for sludge reduction for pretreatment of nitrotoluene wastewater using electro-catalytic redox.

The method comprising: (a) adjusting a pH of the nitrotoluene wastewater to 1.5 to 2.0, standing for precipitation, draining sludge of the nitrotoluene wastewater at the bottom, obtaining supernatant of nitrotoluene wastewater, placing the supernatant through a cathode inlet into a cathode chamber of an electrochemical reactor; the electrochemical reactor including an anode chamber, the cathode chamber, an anode, a cathode, a catholyte tank, a cation exchange membrane, an anolyte tank and flow meters; the anode chamber and the cathode chamber are separated by the cation exchange membrane; the anode and the cathode are located in the anode chamber and a cathode chamber, respectively; the cathode chamber includes the cathode inlet and a cathode outlet; the cathode chamber includes the anode inlet and a anode outlet; the cathode outlet and the catholyte tank are connected via a first channel, the catholyte tank is connected to the anode inlet via a second channel; the outlet of the anode is connected through a third channel with the anolyte tank; the flow meters includes two flow meters, which are located at the channel between the cathode outlet and the catholyte tank and at the third channel between the anode outlet and the anolyte tank; the cathode includes a graphite plate, a titanium plate, a titanium plate loaded with ruthenium oxide or iridium oxide; the anode is a titanium-based dimensionally stable electrode of which a coating is ruthenium oxide or iridium oxide; and a flow direction of wastewater is parallel to the electrode plates.

(b) performing electrochemical treatment, wherein reduction reaction of the supernatant of the nitrotoluene wastewater takes place at the cathode chamber, the nitrotoluene wastewater is placed into the anode chamber for oxidation reaction through the cathode outlet, the catholyte tank, the anode inlet in sequence; a current density of the anode and the cathode is about 5-50 mA/cm$^2$, the nitrotoluene wastewater is placed in the cathode chamber and the anode chamber for about 1-6 h; a distance between the anode and the cathode spacing is about 1.5-3 cm. In reduction reaction at the cathode, a fraction of nitrobenzene in wastewater materials is reduced into substances that are more easily oxidized such as aniline, etc. Electro-catalytic oxidation reaction takes place at the anode to generate product of aniline and nitrobenzene ring opening of small organic molecules. After electrochemical reduction-oxidation process, biodegradability of mixed acid nitration wastewater has improved significantly, while its toxicity reduces significantly.

(c) adjusting the nitrotoluene wastewater treated in step (b) via the anolyte tank, and then discharging the nitrotoluene wastewater into a biochemical system.

In some implementations, the adjusting a pH of the nitrotoluene wastewater to 1.5 to 2.0 and standing for precipitation includes adjusting a pH of the nitrotoluene wastewater to 1.5-2.0 using sulfuric acid or industrial waste acid and standing for precipitation for about 0.5 to 2 hours.

In some implementations, a volume of the catholyte tank is about 5-10 times of a volume of the cathode chamber.

In some implementations, a volume of the anode tank is about 5-10 times of a volume of the anode chamber.

Under conventional techniques, electrochemical methods for treating nitrotoluene wastewater incur high costs and complex operations. However, the embodiments relate to a surprising discover that, adjusting a pH of 1.5 to 2, nitrotoluene, dinitrophenol, and other substances in the nitrotoluene wastewater can be degraded using the structure of electrochemical reactor as described herein as well as materials of electrodes, the distance between the electrodes, and the electrical density, and processing times as entry parameters. These parameters used together not only lower the costs but also make the operations easier. The present disclosure includes many experiments that have been verified to solve problems that those skilled in the art are facing and to change common opinions that electrochemical methods for treating nitrotoluene wastewater incur high costs and complex operations.

3. Beneficial Effect

Compared to conventional techniques, the beneficial effects of the present invention are as follows.

(1) The embodiments coupling reduction and electro-catalytic oxidation processes not only greatly reduce the amount of waste generated during the pretreatment but also has the following effects: a removal rate for removing nitrobenzene and aniline substances from high concentration wastewater (COD>7000 mg/L) is more than 85% COD removal rate is over of 30%, biodegradability (hereinafter referred to as B/C) can be increased from the original 0.08-0.1 to 0.43-0.46, biological toxicity can be reduced to ½₀-⅒ of raw water, as for sludge generated in the process (mainly produced in the acidification process), as compared to other processes, the amount of sludge can be reduced more than 80%, and the effluent can be discharged to a biochemical system;

(2) acidification of the present disclosure and the settlement if electrochemical reduction-oxidation process are necessary steps of the pretreatment. The present disclosure creatively provides acidification processes, which convert natrium phenolicum to phenol precipitation. This reduces organic load of electrochemical processes and has beneficial effects on subsequent electrochemical reduction-oxidation processes. The embodiments of present disclosure include adjusting the wastewater to strong acidic and products of the electrochemical reduction tail aniline, while, under basic or neutral conditions, aniline substances have low yield. This affects the reduction-oxidation treatment of reaction modules. Data shows that, when pH=7, 9, or 12, reduction-oxidation treatment effects (aromatic, B/C and acute toxicity) have different degrees of declines, up to 50% (See the example described below);

(3) The embodiments of the present disclosure replace pharmaceutical dosing with electricity, which not only operates and controls easily but also avoids production of additional waste. To treat mixed acid nitration wastewater, the embodiments of the present disclosure achieve: high efficiency, stability, low-costs of pretreatment, academic significance and practical values.

BRIEF DESCRIPTION OF THE DRAWINGS

FIG. 1 is a schematic diagram of a device used herein. In FIG. 1, 1 indicates anode outlet; 2 indicates cathode outlet; 3 indicates anode chamber; 4 indicates cathode chamber; 5 indicates anode; 6 indicates cathode; 7 indicates anode inlet; 8 indicates cathode inlet; 9 indicates anolyte tank; 10 indicates cation exchange membrane; 11 indicates anolyte tank; and 12 indicates flow meters.

DETAILED DESCRIPTION OF THE PREFERRED EMBODIMENTS

The examples are further provided below.

Example 1

The embodiments relate to a method for sludge reduction for pretreatment of nitrotoluene wastewater using electro-catalytic redox, the method comprising:

(a) adjusting a pH of nitrotoluene wastewater (COD~9000 mg/L, nitro-containing toluene, dinitrophenol and other substances, pH=12.3) to 1.8, standing for precipitation for about 30 min, draining sludge of the nitrotoluene wastewater at the bottom, obtaining supernatant of nitrotoluene wastewater, placing the supernatant through a cathode inlet (8) into a cathode chamber (4) of an electrochemical reactor;

As illustrated in FIG. 1, the electrochemical reactor including an anode chamber (3), the cathode chamber (4), an anode (5), a cathode (6), a catholyte tank (9), a cation exchange membrane (10), an anolyte tank (11) and flow meters (12); the anode chamber (3) and the cathode chamber (4) are separated by the cation exchange membrane (10); the anode (5) and the cathode (6) are located in the anode chamber (3) and a cathode chamber (4), respectively; the cathode chamber (4) includes the cathode inlet (8) and a cathode outlet (2); the anode chamber (3) includes the anode outlet (1) and the anode inlet (7); the cathode outlet (2) and the catholyte tank (9) are connected via a first channel, the catholyte tank (9) is connected to the anode inlet (7) via a second channel; the outlet of the anode (1) is connected through a third channel with the anolyte tank (11); the flow meters (12) includes two flow meters, which are located at the channel between the cathode outlet (2) and the catholyte tank (9) and at the third channel between the anode outlet (1) and the anolyte tank (11); the cathode plate includes a graphite plate. The anode (5) is a titanium-based dimensionally stable electrode of which a coating is ruthenium oxide or iridium oxide; a flow direction of wastewater is parallel to the electrode plates; the acid for adjustment includes sulfuric acid. A volume of the catholyte tank 9 is about 8 times of a volume of the cathode chamber 4. A volume of the anolyte tank is about 9 times of a volume of the anode chamber.

(b) performing electrochemical treatment, wherein reduction reaction of the supernatant of the nitrotoluene wastewater takes place at the cathode chamber (4), the nitrotoluene wastewater is placed into the anode chamber (3) for oxidation reaction through the cathode outlet (2), the catholyte tank (9), the anode inlet (7) in sequence; a current density of the anode (5) and the cathode (6) is about 10 mA/cm$^2$, the nitrotoluene wastewater is placed in the cathode chamber (4) and the anode chamber (3) for about 2 h; a distance between the anode (5) and the cathode (6) spacing is about 2 cm;

(c) adjusting the nitrotoluene wastewater treated in step (b) via the anolyte tank (11), and then discharging the nitrotoluene wastewater into a biochemical system.

Water parameters of each section as follows:

| Section\Index | COD | B/C | Half lethal concentration (*Daphnia magna*) |
|---|---|---|---|
| Acidification | 4500-4600 | 0.07-0.09 | 0.1%-0.5% |
| Electrochemical Reduction | 3800-3900 | 0.09-0.12 | 1%-2% |
| Electrochemical oxidation | 3600-3700 | 0.35-0.4 | 1%-2% |

Example 2

Operating conditions of Example 2 is similar to those of Example 1 except for the following operations and conditions.

A pH of the nitrotoluene wastewater is about 12.1 and was adjusted to 1.5 using industrial waste acid. The standing time for precipitation is about 60 min. The current between the anode 5 and the cathode 6 is about 20 mA/cm$^2$, and the cathode 6 includes a titanium plate. The wastewater stayed in the cathode chamber 3 and the anode chamber 4 for about 2 hours. The volume of the catholyte tank 9 is about 5 times of the volume of the cathode chamber 4. A volume of the anolyte tank 11 is about 5 times of a volume of the anode chamber 3. A distance between the anode (5) and the cathode (6) spacing is about 3 cm;

Water parameters of each section as follows:

| Section\index | COD | B/C | Half lethal concentration (*daphnia magna*) |
|---|---|---|---|
| Acidification | 4400-4500 | 0.07-0.11 | 0.1%-0.5% |
| Electrochemical reduction | 3600-3800 | 0.12-0.14 | 2%-3% |
| Electrochemical oxidation | 3100-3200 | 0.43-0.46 | 3%-4% |

Example 3

Operating conditions of Example 2 is similar to those of Example 1 except for the following operations and conditions.

A pH of the nitrotoluene wastewater is about 12.2 and was adjusted to 2.0. The standing time for precipitation is about 100 min. The current between the anode 5 and the cathode is about 30 mA/cm$^2$, and the cathode includes a titanium plate loaded with ruthenium oxide. The wastewater stayed in the cathode chamber 3 and the anode chamber 4 for about 2 hours. A volume of the catholyte tank 9 is about 10 times of a volume of the cathode chamber 4. A volume of the anolyte tank 11 is about 10 times of a volume of the anode chamber 3. A distance between the anode (5) and the cathode (6) spacing is about 1.5 cm;

Water parameters of each section as follows:

| Section\Index | COD | B/C | Half lethal concentration (Daphnia magna) |
|---|---|---|---|
| Acidification | 4400-4500 | 0.07-0.11 | 0.1%-0.5% |
| Electrochemical Reduction | 3600-3700 | 0.14-0.16 | 2%-4% |
| Electrochemical oxidation | 3000-3100 | 0.45-0.47 | 3.5%-4.5% |

Example 4

Operating conditions of Example 2 is similar to those of Example 1 except for the following operations and conditions.

pH of the nitrotoluene wastewater (COD~9500 mg/L) is about 12.4 and was adjusted to 2.0. The current between the anode 5 and the cathode 6 is about 10 mA/cm$^2$, and the cathode 6 includes a titanium plate loaded with iridium oxide. The wastewater stayed in the cathode chamber 3 and the anode chamber 4 for about 6 hours. A volume of the catholyte tank 9 is about 7 times of a volume of the cathode chamber 4. A volume of the anolyte tank 11 is about 7 times of a volume of the anode chamber 3.

Water parameters of each section as follows:

| Section\index | COD | B/C | Half lethal concentration (daphnia magna) |
|---|---|---|---|
| Acidification | 4800-5000 | 0.06-0.08 | 0.1%-0.5% |
| Electrochemical reduction | 4300-4500 | 0.11-0.12 | 2% |
| Electrochemical oxidation | 3800-4000 | 0.41-0.43 | 2%-4% |

Example 5

Operating conditions of Example 2 is similar to those of Example 1 except for the following operations and conditions.

A pH of the nitrotoluene wastewater (COD~9500 mg/L) is about 12.4 and was adjusted to 1.5 using industrial waste acid. The standing time for precipitation is about 120 min. The current between the anode 5 and the cathode 6 is about 20 mA/cm$^2$, and the cathode 6 includes a titanium plate loaded with iridium oxide. The wastewater stayed in the cathode chamber 3 and the anode chamber 4 for about 3 hours. A distance between the anode (5) and the cathode (6) spacing is about 2.5 cm.

Water parameters of each section as follows:

| Section\Index | COD | B/C | Half lethal concentration (Daphnia magna) |
|---|---|---|---|
| Acidification | 4800-5000 | 0.06-0.08 | 0.1%-0.5% |
| Electrochemical Reduction | 4200-4300 | 0.12-0.14 | 2%-4% |
| Electrochemical oxidation | 3900-4000 | 0.46-0.48 | 4%-5% |

Example 6

Operating conditions of Example 2 is similar to those of Example 1 except for the following operations and conditions.

pH of the nitrotoluene wastewater (COD~9500 mg/L) is about 12.4 and was adjusted to 1.7. The current between the anode 5 and the cathode 6 is about 50 mA/cm$^2$. the wastewater stayed in the cathode chamber 3 and the anode chamber 4 for about 3 hours.

Water parameters of each section as follows:

| Section\Index | COD | B/C | Half lethal concentration (Daphnia magna) |
|---|---|---|---|
| acidification | 4800-5000 | 0.06-0.08 | 0.1%-0.5% |
| Electrochemical Reduction | 4000-4200 | 0.14-0.15 | 3% |
| Electrochemical oxidation | 3700-3900 | 0.48-0.49 | 4%-5% |

Example 7

Operating conditions of Example 2 is similar to those of Example 1 except for the following operations and conditions.

A pH of the nitrotoluene wastewater (COD~8500 mg/L) is about 12.4. The current between the anode 5 and the cathode 6 is about 10 mA/cm$^2$. The wastewater stayed in the cathode chamber 3 and the anode chamber 4 for about 1 hours.

Water parameters of each section as follows:

| Section\Index | COD | B/C | Half lethal concentration (Daphnia magna) |
|---|---|---|---|
| acidification | 4500-4600 | 0.08-0.1 | 0.1%-0.5% |
| Electrochemical Reduction | 4200-4400 | 0.1-0.12 | 1%-2% |
| Electrochemical oxidation | 3900-4000 | 0.25-0.30 | 1%-2% |

Example 8

Operating conditions of Example 2 is similar to those of Example 1 except for the following operations and conditions.

pH of the nitrotoluene wastewater (COD~8500 mg/L) is about 12.4. The current between the anode 5 and the cathode 6 is about 20 mA/cm$^2$. the wastewater stayed in the cathode chamber 3 and the anode chamber 4 for about 1 hours.

Water parameters of each section as follows:

| Section\index | COD | B/C | Half lethal concentration (daphnia magna) |
|---|---|---|---|
| Acidification | 4500-4600 | 0.08-0.1 | 0.1%-0.5% |
| Electrochemical reduction | 4000-4200 | 0.1-0.12 | 1%-2% |
| Electrochemical oxidation | 3800-3900 | 0.28-0.32 | 2% |

Example 9

Operating conditions of Example 2 is similar to those of Example 1 except for the following operations and conditions.

pH of the nitrotoluene wastewater (COD~8500 mg/L) is about 12.4 and was adjusted to 1.5. The standing time for precipitation is about 60 min. The current between the anode 5 and the cathode 6 is about 30 mA/cm$^2$. the wastewater stayed in the cathode chamber 3 and the anode chamber 4 for about 1 hours.

Water parameters of each section as follows:

| Section\Index | COD | B/C | Half lethal concentration (*Daphnia magna*) |
|---|---|---|---|
| acidification | 4500-4600 | 0.08-0.1 | 0.1%-0.5% |
| Electrochemical Reduction | 3900-4000 | 0.11-0.12 | 1%-2% |
| Electrochemical oxidation | 3700-3800 | 0.3-0.35 | 2%-3% |

Example 10

Operating conditions of Example 2 is similar to those of Example 1 except for the following operations and conditions.

pH of the nitrotoluene wastewater (COD~9000 mg/L) is about 12.4 and was adjusted to 3.8. The sludge at the bottom was drained out, and the supernatant was put into the electrochemical reactor for reduction reaction for about 2 hours with the current density is about 20 mA/cm$^2$ at the cathode chamber. The reduction solution was returned to the anode chamber for catalytic oxidation for about 1 hour with the same current density.

Water parameters of each section as follows:

| Section\Index | COD | B/C | Half lethal concentration (*Daphnia magna*) |
|---|---|---|---|
| acidification | 6500-6600 | 0.05-0.07 | 0.05%-0.1% |
| Electrochemical Reduction | 5900-6000 | 0.08-0.09 | 0.5%-1% |
| Electrochemical oxidation | 5700-5800 | 0.15-0.2 | 0.5%-1% |

Example 11

Operating conditions of Example 2 is similar to those of Example 1 except for the following operations and conditions.

pH of the nitrotoluene wastewater (COD~9000 mg/L) is about 12.4 and was adjusted to 1.8. The standing time for precipitation is about 30 min. The sludge at the bottom was drained out, and the supernatant was adjusted to pH 7.0 and then put into the electrochemical reactor for reduction reaction for about 2 hours with the current density is about 20 mA/cm$^2$ at the cathode chamber. The reduction solution was returned to the anode chamber for catalytic oxidation for about 1 hour with the same current density.

Water parameters of each section as follows:

| Section\index | Cod | B/c | Half lethal concentration (*daphnia magna*) |
|---|---|---|---|
| Acidification | 4500-4600 | 0.08-0.1 | 0.1%-0.5% |
| Electrochemical reduction | 3900-4000 | 0.1-0.12 | 0.5%-1% |
| Electrochemical oxidation | 3700-3800 | 0.35-0.4 | 1%-2% |

Example 12

Operating conditions of Example 2 is similar to those of Example 1 except for the following operations and conditions.

pH of the nitrotoluene wastewater (COD~9000 mg/L) is about 12.4 and was adjusted to 1.8. The standing time for precipitation is about 30 min. The sludge at the bottom was drained out, and the supernatant was adjusted to pH 12.0 and then put into the electrochemical reactor for reduction reaction for about 2 hours with the current density is about 20 mA/cm$^2$ at the cathode chamber. The reduction solution was returned to the anode chamber for catalytic oxidation for about 1 hour with the same current density.

Water parameters of each section as follows:

| Section\index | COD | B/C | Half lethal concentration (*daphnia magna*) |
|---|---|---|---|
| Acidification | 4500-4600 | 0.08-0.1 | 0.1%-0.5% |
| Electrochemical reduction | 4000-4100 | 0.1-0.12 | 0.5%-1% |
| Electrochemical oxidation | 3800-3900 | 0.3-0.35 | 1%-2% |

As shown above, the embodiments of the present disclosure significantly reduce the toxicity of the effluent after electrochemical oxidation, and B/C<0.4 show better performance of biological wastewater for the subsequent processing operations using conventional methods. On contrast, implementations not using the embodiments herein (e.g., pH being alkaline or neutral) even using similar devices have undesired results, for example, for B/C<0.4. As compared to the embodiments of the present disclosure, conventional techniques have poor biochemical properties such as to cause subsequent processing more difficult.

What is claimed is:
1. A method for sludge reduction for pretreatment of nitrotoluene wastewater using electro-catalytic redox, the method comprising:
  (a) adjusting a pH of the nitrotoluene wastewater to 1.5 to 2.0, permitting to stand until precipitation, draining sludge of the nitrotoluene wastewater at bottom, obtaining supernatant of nitrotoluene wastewater, and placing the supernatant through a cathode inlet into a cathode chamber of an electrochemical reactor, wherein:
  the electrochemical reactor comprising an anode chamber, the cathode chamber, an anode, a cathode, a catholyte tank, a cation exchange membrane, an anolyte tank and flow meters,
  the anode chamber and the cathode chamber are separated by the cation exchange membrane, the anode and the cathode are located in the anode chamber and a cathode chamber, respectively, the cathode chamber comprises the cathode inlet and a cathode outlet, the anode chamber comprises the anode outlet and the anode inlet, the cathode outlet and the catholyte tank are connected via a first channel, the catholyte tank is connected to the anode inlet via a second channel, the outlet of the anode is connected through a third channel with the anolyte tank, the flow meters comprise two flow meters, which are located at the first channel between the cathode outlet and the catholyte tank and at the third channel between the anode outlet and the anolyte tank, the cathode comprises a material selected from the group of a graphite plate, a titanium plate, a titanium plate loaded with ruthenium oxide or iridium oxide, and the anode is a titanium-based dimensionally stable electrode of which a coating comprises ruthenium oxide or iridium oxide;

(b) performing electrochemical treatment, wherein:

reduction reaction of the supernatant of the nitrotoluene wastewater takes place at the cathode chamber, the nitrotoluene wastewater is placed into the anode chamber for oxidation reaction through the cathode outlet, the catholyte tank, and the anode inlet in sequence, a current density of the anode and the cathode is about 5 to 50 mA/cm$^2$, the nitrotoluene wastewater is placed in the cathode chamber and the anode chamber for about 1 to 6 h, and a distance between the anode and the cathode spacing is about 1.5 to 3 cm; and (c) discharging the nitrotoluene wastewater into a biochemical system.

2. The method of claim 1, wherein the adjusting the pH of the nitrotoluene wastewater to 1.5 to 2.0 and permitting to stand until precipitation comprises adjusting the pH of the nitrotoluene wastewater to 1.5 to 2.0 using sulfuric acid or industrial waste acid and permitting to stand for about 0.5 to 2 hours until precipitation.

3. The method of claim 1, wherein a volume of the catholyte tank is about 5 to 10 times of a volume of the cathode chamber.

4. The method of claim 1, wherein a volume of the anode tank is about 5 to 10 times of a volume of the anode chamber.

* * * * *